United States Patent [19]

Kito et al.

[11] Patent Number: 4,734,634
[45] Date of Patent: Mar. 29, 1988

[54] METHOD AND SYSTEM FOR RECONNECTING INVERTER TO ROTATING MOTORS

[75] Inventors: Yasutami Kito, Haruhi; Kuniake Yasukawa, Gifu, both of Japan

[73] Assignee: Kabushiki Kaisha Meidensha, Japan

[21] Appl. No.: 938,321

[22] Filed: Nov. 28, 1986

Related U.S. Application Data

[63] Continuation of Ser. No. 719,465, Apr. 3, 1985.

[30] Foreign Application Priority Data

Sep. 5, 1984 [JP] Japan ................................. 59-186217
Sep. 21, 1984 [JP] Japan ................................. 59-198065

[51] Int. Cl.$^4$ .............................................. H02P 3/18
[52] U.S. Cl. ...................................... 318/778; 318/808
[58] Field of Search .......................... 318/778, 807–811

[56] References Cited

U.S. PATENT DOCUMENTS

| | | | |
|---|---|---|---|
| 3,593,103 | 7/1971 | Chandler | 318/808 |
| 4,047,083 | 9/1977 | Plunkett | 318/807 |
| 4,409,533 | 10/1983 | Kawabata . | |
| 4,417,193 | 11/1983 | Hirata | 318/808 |
| 4,445,167 | 4/1984 | Okado | 318/811 |
| 4,451,112 | 5/1984 | Hattori et al. | 318/778 |
| 4,456,865 | 6/1984 | Robertson, Jr. et al. | 318/810 |

FOREIGN PATENT DOCUMENTS 2093288A 1/1982 United Kingdom .

Primary Examiner—David Smith, Jr.
Attorney, Agent, or Firm—Lowe, Price, LeBlanc, Becker & Shur

[57] ABSTRACT

When an inverter is disconnected from a rotating motor due to power failure or motor accident, it is necessary to connect the inverter power again to the rotating motor by the inertia force in order to keep the motor rotating. To achieve the above reconnection, the inverter is controlled in accordance with open-loop control method, without use of any motor speed detecting means, thus improving control response speed. In reconnection, the inverter is started at a frequency higher than the rotating motor speed and at a voltage lower than the rated value; when a predetermined time has elapsed after the starting voltage was applied to the motor, only the frequency is decreased; when inverter driving current drops below a predetermined value, the frequency is held and only the voltage is increased until the voltage-to-frequency ratio reaches a predetermined value.

6 Claims, 6 Drawing Figures

METHOD AND SYSTEM FOR RECONNECTING INVERTER TO ROTATING MOTORS

This application is a continuation of application Ser. No. 719,465, filed Apr. 3, 1985.

BACKGROUND OF THE INVENTION

1. Field of the Invention

The present invention relates to a method and a system for reconnecting an inverter to rotating motors, and more particularly to a method and a system for connecting again an inverter, which is now controlling induction motors at predetermined frequency and voltage, to the motors rotating due to the inertia force of the motor rotor, after the inverter has once been disconnected from the induction motors because of power failure or motor accident. In the method according to the present invention, the inverter is connected to rotating motors again in accordance with a forward control method or an open-loop control method, in place of a feedback control method or a closed-loop control method.

2. Description of the Prior Art

Induction motors are usually driven by an inverter. The inverter converts a DC power source rectified by a bridge-connected semiconductor rectifier and a capacitor into an AC power source suitable for driving the induction motors at predetermined frequency and torque. The rotational speed of an induction motor can effectively be controlled by the inverter in accordance with pulse width modulation method (described later).

By the way, in order to continuously drive the induction motor, an uninterrupted power supply equipment is usually incorporated in the induction motor driving system including the inverter. In such a system as described above, in case commercial AC power source fails, power interruption is first detected by a power monitor relay and then the inverter is immediately disconnected from the induction motor in order to protect the inverter elements from being damaged by a great rush current applied from the motor to the inverter. Thereafter (after one or two seconds), the uninterrupted power supply equipment is connected again to the motor driving system. Under these conditions, since the induction motor is still rotating due to an inertia force of the motor rotor, it is indispensable to synchronously reconnect the inverter to the induction motor. In other words, the inverter must be reconnected to the rotating motor after matching inverter frequency to motor speed or inverter phase to motor back electromotive force phase. Otherwise, a great rush current will be generated by the motor and will damage the inverter elements, thus resulting in failure of reconnection between the inverter and the induction motor.

Further, there exists another case where a plurality of parallel-connected induction motors are driven by a single inverter. In such a system as described above, in case one of the motors is connected to ground by accident (ground fault), a large current discharged from the smoothing capacitor in the rectifier is sensed by a current transformer in order to immediately disconnect the inverter elements from the induction motors; that is, a circuit breaker arranged in the main circuit of induction motors is immediately opened. In this state, since power regenerated by the kinetic energy of the remaining normal induction motors is applied to the abnormal ground fault induction motor, a fuse arranged between the inverter and the abnormal motor is blown out to isolate the abnormal motor from the motor driving system. In response to the fuse melt signal, the inverter is restarted. Under these conditions, similarly, since the induction motor is still rotating due to an inertia force of the motor rotor, it is indispensable to close the circuit breaker arranged in the main circuit of the induction motors when the inverter is synchronized with the induction motors, that is, when inverter phase matches motor back electromotive force phase.

Furthermore, commercial power source often fails for a short time (one or two seconds). In these cases, it is necessary to reconnect the inverter to the rotating motor after an appropriate time has elapsed (1 to 3 seconds). This is because a great rush current will flow to the inverter when the inverter is restarted in asynchronization between the inverter and the induction motor in phase; as a result, an interrupter arranged on the main power supply side may trip and further the inverter elements may be damaged at the worst.

It is of course possible to reconnect the inverter to the motor after the motor has completely been stopped due to power failure. however, there exist some serious cases (e.g. a loom) where the whole product now being woven becomes defective in case the machine stops during a weaving operation.

In the prior-art system for reconnecting the inverter to rotating induction motors, a tachometer is conventionally attached to the induction motor side in order to detect the rotational speed of the induction motor. In more detail, motor rotational speed or motor back electromotive force phase is monitored by the tachometer; and when the monitored motor phase matches the inverter phase, the inverter is reconnected to the induction motor. In other words, the reconnecting operation between the inverter and the induction motor is achieved in accordance with a feedback control method or by a closed-loop control method.

In the prior-art system for reconnecting an inverter to a rotating induction motor, however, there exist the following drawbacks: (1) In the case of feedback control method depending upon a tachometer, control response speed is not high. That is, it takes a relatively-long time to completely synchronize inverter phase with induction motor back electromotive force phase. (2) In use of a tachometer, an additional complicated circuit is necessary to distinguish the rotational directions (clockwise or counterclockwise) of the induction motor. (3) Since the tachometer must be attached to the induction motor independently from the system for reconnecting an inverter to an induction motor, this is rather troublesome to the users.

In this connection, there exists another system for reconnecting an inverter to a rotating synchronous motor, in place of an induction motor. In this case, the synchronization between the inverter and the synchronous motor can be achieved in accordance with feedback control method by detecting back electromotive force generated from the synchronous motor rotating due to an inertia force of the motor rotor. However, since it is necessary to perfectly match the back electromotive force phase of the synchronous motor to inverter phase, a complicated circuit may be required.

SUMMARY OF THE INVENTION

With these problems in mind, therefore, it is the primary object of the present invention to provide a method and system for reconnecting an inverter to rotating motors without use of any tachometers or without detecting motor speed, in other words, in accordance with forward-control method or open-loop control method in order to improve control response speed in reconnecting operation.

The other object of the present invention is to provide a method and system for reconnecting an inverter to rotating motors, which is simple in system configuration and stable in reconnecting operation.

To achieve the above the above-mentioned object, the method of reconnecting an inverter to a rotating motor according to the present invention comprises the following steps of: (a) starting the inverter at a starting frequency higher than a rotational speed of the motor being rotated by the inertia force of the rotor and at a starting voltage lower than a rated value of the motor, (b) when a predetermined time period has elapsed after the starting voltage was applied to the motor, decreasing the inverter frequency gradually, (c) detecting inverter current supplied to the motor, (d) when the detected inverter current drops below a predetermined current value, holding the decreasing inverter frequency at a constant value and increasing only the inverter voltage gradually, (e) calculating a ratio of inverter voltage to inverter frequency; and (f) when the calculated voltage-to-frequency ratio reaches a predetermined value, simultaneously increasing the inverter frequency and the inverter voltage gradually at the predetermined voltage-to-frequency ratio until the motor is driven at a predetermined speed in steady state.

To achieve the above-mentioned object, the system for reconnecting an inverter to a rotating motor according to the present invention comprises: (a) means for detecting inverter current, (b) microcomputer means responsive to said current detector, said microcomputer generating a first inverter frequency starting command signal $F_{S1}$, a second inverter frequency decreasing command signal $F_{S2}$ when a first predetermined time period has elapsed after the first command signal $F_{S1}$ was generated, a third inverter frequency holding command signal $F_{S3}$ when inverter current detected by said current detecting means drops below a predetermined current value, a fourth inverter frequency increasing command signal $F_{S4}$ when a ratio of inverter voltage to inverter frequency reaches a predetermined value, a fifth inverter frequency controlling command signal $F_{S5}$ when inverter frequency and voltage both reach their predetermined values, respectively, at the predetermined voltage-to-frequency ratio, and further a first inverter voltage starting command signal $V_{S1}$ when a second predetermined time period has elapsed after the first frequency command signal $F_{S1}$ was generated, a second inverter voltage command signal $V_{S2}$ when a third predetermined time period has elapsed after the first voltage command signal $V_{S1}$ was generated, a third inverter voltage increasing command signal $V_{S3}$ when inverter current detector by said current detecting means drops below the predetermined current value, a fourth inverter voltage increasing command signal $V_{S4}$ when the ratio of inverter voltage to inverter frequency reaches the predetermined value, and a fifth inverter voltage controlling command signal $V_{S5}$ when inverter frequency and voltage both reach their predetermined values, respectively, at the predetermined voltage-to-frequency ratio, (c) means responsive to said microcomputer means for controlling inverter frequencies, said controlling means outputting a first voltage representative of a first inverter frequency starting signal for starting the inverter at a predetermined starting frequency in response to the first frequency command signal $F_{S1}$, a second voltage representative of a second inverter frequency decreasing signal for decreasing the started inverter frequency gradually in response to the second frequency command signal $F_{S2}$, a third voltage representative of a third inverter frequency holding signal for holding the decreasing inverter frequency at a constant value in response to the third frequency command signal $F_{S3}$, a fourth voltage representative of a fourth inverter frequency increasing signal for increasing the held inverter frequency in response to the fourth frequency command signal $F_{S4}$, and a fifth voltage representative of a fifth inverter frequency controlling signal for steadily controlling inverter frequency in response to the fifth frequency command signal $F_{S5}$, and (d) means responsive to said microcomputer means and said frequency controlling means for generating pulse-width-modulated inverter gate signals in sequence to activate the inverter in response to the first, second, third, fourth and fifth voltages representative of inverter frequencies and the first, second, third, fourth and fifth inverter voltage command signals.

BRIEF DESCRIPTION OF THE DRAWINGS

The features and advantages of the method and system for reconnecting an inverter to rotating motor according to the present invention over the prior-art system will be more clearly appreciated from the following description taken in conjunction with the accompanying drawings in which like reference numerals designate the same or similar elements or sections throughout the figures thereof and in which.

DETAILED DESCRIPTION OF THE PREFERRED EMBODIMENT

With reference to the attached drawings, reference is now made to the embodiments of the system of reconnecting an inverter to a rotating motor according to the present invention.

Figure 1:
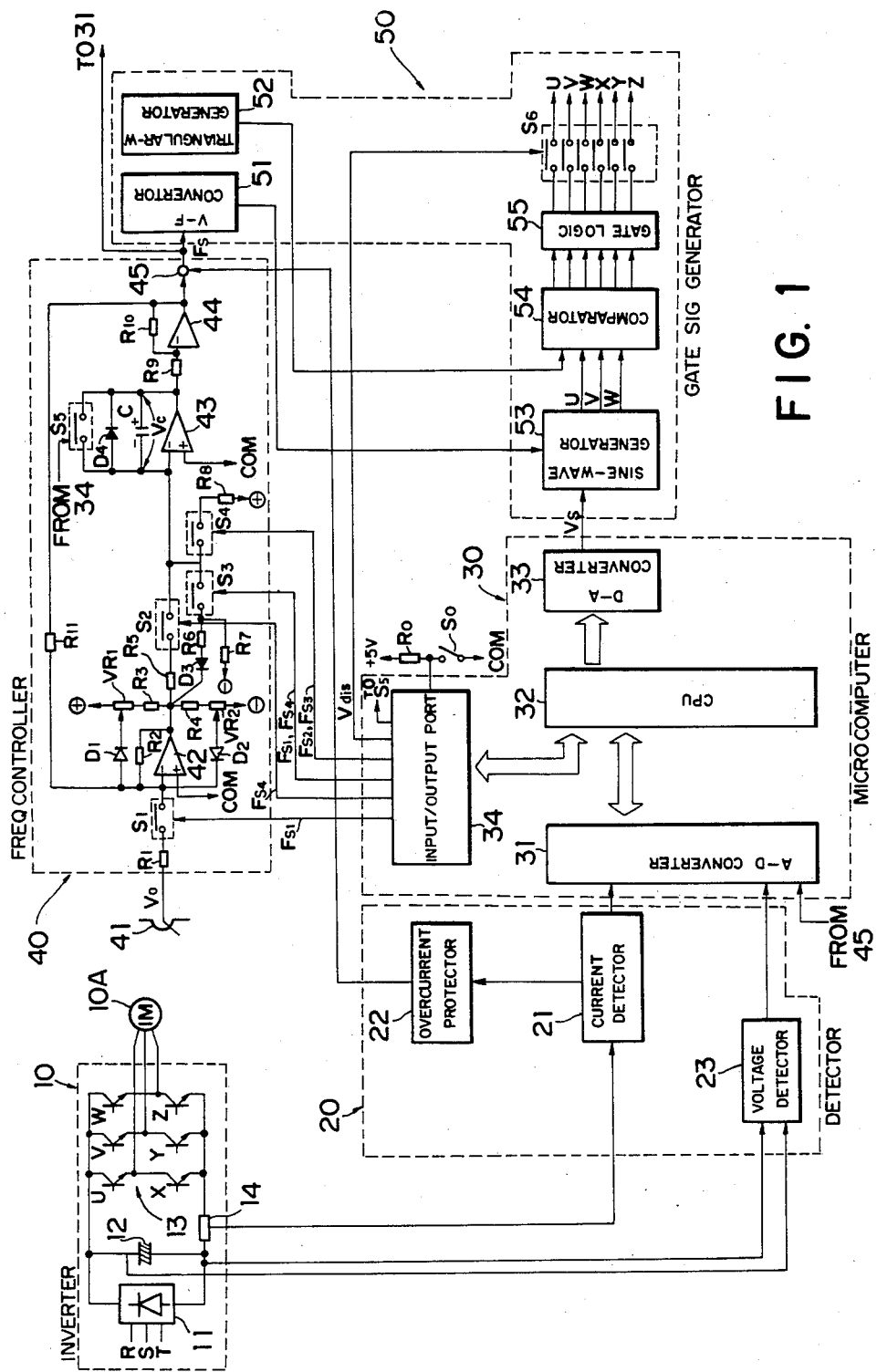
FIG. 1 is a schematic block diagram showing a motor driving system including an inverter and the system for reconnecting the inverter to a rotating motor of a first embodiment according to the present invention.

FIG. 1 shows a system configuration of a first embodiment of the present invention. The system is roughly made up of an inverter section 10, an inverter voltage/current detector section 20, a microcomputer section 30, an inverter frequency controller section 40 and an inverter gate signal generator section 50.

The inverter section 10 includes a diode bridge-connected power rectifier (AC-DC converter) 11, a smoothing capacitor 12, a power inverter (DC-AC converter) 13 for driving an induction motor 10A and a shunt resistance 14 for detecting inverter current.

The three-phase commercial AC power source R, S, T, is first rectified by the diode power rectifier 11 and the smoothing capacitor 12 into a DC power supply. The rectified DC power supply is then converted, by the power inverter 13 activated by the aid of the gate signal generator section 50, into an AC power supply having an appropriate frequency F and an appropriate voltage V both so determined so as to drive the induction motor 10A at a predetermined speed and torque. The power inverter 13 is made up of six bridge-connected switching semiconductor elements such as power transistors U, V, W, X, Y and Z. These switching power transistors are of course replaceable with other elements such as thyristors, gate-turn-off thyristors, etc.

In the power inverter 13, an inverter output having any desired pulse widths and pulse intervals can be obtained by appropriately applying gate signals from the gate signal generator section 50 to the base of each power transistor in sequence. In other words, it is possible to obtain any desired power supply having different effective voltages and different frequencies by controlling inverter gate signals. In more detail, the inverter output power increases with increasing inverter gate frequency; the effective inverter voltage increases with increasing inverter gate pulse width or with decreasing inverter gate pulse interval. Further, in general, PWM (Pulse Width Modulation) control method is adopted in order to simultaneously control both the frequency and the voltage of the inverter power supply, in which a sine-wave signal is compared with a triangular-wave carrier signal with a frequency at least several times higher than that of the sine-wave signal in order to determine each timing of the gate signals. The above-mentioned PWM method is implemented by the gate signal generator section 50, as described later. Further, when the motor is driven by the inverter in steady state, the ratio (V/F) of inverter voltage to inverter frequency is kept at a predetermined value under a given motor load. The shunt resistance 14 is connected between the DC power supply and the power inverter to detect a small current proportional to a large inverter current flowing therebetween.

The detector section 20 includes a current detector 21 connected to the shunt resistance 14, an overcurrent protector 22 connected to the current detector 21, and a voltage detector 23 connected across the smoothing capacitor 12.

Inverter current detected by the current detector 21 is utilized to detect a reconnection point. In more detail, a time point at which the inverter current drops belows a predetermined value is called a reconnection point. Once this point is detected, inverter frequency F is held at a lower constant level and inverter voltage V is increased gradually to a value corresponding to the held frequency when a fixed V/F ratio is determined, as described later in more detail.

Further, the overcurrent protector 22 serves to prevent an overcurrent from flowing through the power inverter 13 when the motor 10A is accelerated by increasing inverter voltage after the reconnection point. The voltage detector 23 serves to detect the DC power supply voltage and to prevent an overvoltage from being applied to the inverter 13.

The inverter frequency controller section 40 roughly includes an inverter frequency presetting device 41, a limiter amplifier 42 of operational amplifier type, an integrating circuit 43 of operational amplifier type including a capacitor C, an operational amplifier 44, a comparison point 45 and a first, second, third, fourth and fifth switches $S_1$ to $S_5$.

The inverter frequency presetting device 41 is of variable resistor type, which outputs an inverter frequency presetting voltage signal $V_0$. When this signal $V_0$ is set to a higher voltage value, the inverter frequency increases to a higher value; when $V_0$ is set to a lower voltage value, the frequency decreases to a lower value, as well understood later in more detail.

Further, the relationship between motor rotational speed and inverter frequency can be expressed as follows:

$$N_0 = \frac{2}{P} \times f \text{ or } N = \frac{120}{P} \times f$$

where $N_0$ the number of motor revolutions per second, N denotes the number of motor revolutions per minute, P denotes the number of motor poles, and f denotes the frequency per second.

The limiter amplifier 42 is of inversion amplifier type. The frequency presetting signal $V_0$ is applied to the out-of-phase terminal (−) of the amplifier 42 through a resistor $R_1$ when the first switch $S_1$ is closed in response to a first inverter frequency command signal $F_{S1}$ (start signal). A switch $S_0$ serves to select a current value $I_0$ passed at the motor reconnection point. A resistor $R_2$ is a negative feedback resistor; a variable resistor $VR_1$ serves to decide the upper limit of the negative amplifier output voltage; a variable resistor $VR_2$ serves to decide the lower limit of the same amplifier output voltage; further a variable resistor $VR_1$ serves to adjust the upper limit of the negative amplifier output voltage; a variable resistor $VR_2$ serves to adjust the lower limit of the negative amplifier output voltage. A diode $D_1$ serves to determine the upper limit level when a positive voltage higher than the upper limit voltage is applied to the out-of-phase terminal (−) of the amplifier 42; a diode $D_2$ serves to determine the lower limit level when a negative voltage lower than the lower limit voltage is applied to the out-of-phase terminal (−) of the amplifier 42. Therefore, it is possible to determine the lower or upper voltage limit by adjusting the variable resistor $VR_1$ or $VR_2$. Further, since a negative feedback resistor $R_{11}$ of the frequency controller section 40 is connected to the terminal (−) of the amplifier 42, in reality a difference between the preset voltage and the negative feedbacked voltage is applied to the terminal (−) of the amplifier 42.

The output signal of the limit amplifier 42 is applied to the integrating circuit 43 including a capacitor C through four capacitor charging or discharging routes as described later in more detail. The integrating circuit 43 is also of inversion type operational amplifier. A diode $D_4$ and a fifth switch $S_5$ are both connected across the capacitor C. The fifth switch $S_5$ serves to discharge (reset) the capacitor when closed; the diode $D_4$ serves to always charge the capacitor C with the polarity as shown in FIG. 1. The in-phase terminal (+) of the integrating circuit 43 is also connected to a positive voltage supply COM (0 volt).

When a negative voltage signal is applied to the out-of-phase terminal (−) of the integrating circuit 43, the positive output voltage thereof is returned to the out-of-phase terminal (−) thereof through the capacitor C, so that the capacitor C is charged up with the polarity as shown. The output voltage of the integrating circuit 43 rises roughly in proportion to the charged voltage across the capacitor C.

Four capacitor charging/discharging routes are formed as follows:

(1) When the switch $S_3$ is closed in response to a first inverter frequency starting command signal $F_{S1}$ applied from the microcomputer section 30, the capacitor C is charged up to a voltage preset by the frequency presetting device 41 through a first route ($D_3$ and $R_6$) having a relatively short time constant roughly determined by the product ($C.R_6$) of the capacitance C and the resistance $R_6$ so as to quickly increase inverter frequency.

(2) As far as the switch $S_3$ is kept closed, the capacitor C is further charged up to a higher value through a second route ($R_7$) having a relatively long time constant roughly determined by the product ($C.R_7$) so as to slowly increase inverter frequency. This is because the resistor $R_7$ is connected to a negative supply voltage. However, when the switch $S_3$ is opened in response to a second inverter frequency decreasing command signal $F_{S2}$, the capacitor is no longer charged through the resistor $R_7$.

(3) When the switch $S_3$ is opened and the switch $S_4$ is closed in response to the second inverter frequency decreasing command signal $F_{S2}$ applied from the microcomputer section 30, the capacitor C is reversely charged near to zero through a third route ($R_8$) having a medium time constant roughly determined by the product ($C.R_8$) so as to decrease inverter frequency. This is because the resistor $R_8$ is connected to a positive supply voltage terminal. When the switch $S_4$ is opened in response to a third inverter frequency command holding signal $F_{S3}$, the capacitor is no longer reversely charged through the resistor $R_8$ so as to hold inverter frequency at a constant value.

(4) When the switch $S_2$ is closed and the switch $S_3$ is opened in response to a fourth inverter frequency increasing command $F_{S4}$, the capacitor C is again charged to a voltage preset by the frequency presetting device 41 through a fourth route ($R_5$) having a medium time constant roughly determined by the product ($C.R_5$) so as to gradually increase inverter frequency.

The operational amplifier 44 is connected to the output of the integrating circuit 43 through a resistor $R_9$. A resistor $R_{10}$ is a feedback resistor for the operational amplifier 44. This amplifier 44 is also of inversion type. Therefore, when a positive signal is applied to the out-of-phase terminal (−) thereof, a negative amplifier signal is fed back to the terminal (−) of the amplifier 42 through the resistor $R_{11}$. The output of the amplifier 44 rises to the voltage of the frequency presetting signal $V_0$.

The comparison point 45 serves to compare the output signal of the amplifier 44 with that of the overcurrent protector 22. When the overcurrent protector 22 output an abnormal signal, the comparison point 45 lowers the voltage level to hold or decrease the inverter frequency at or to a predetermined level.

The microcomputer section 30 includes an analog-to-digital (A-D) converter 31, a central processing unit (CPU) 32, a digital-to-analog (D-A) converter 33 and an output port 34.

The A-D converter 31 receives the analog signals from the current detector 21, the voltage detector 23 and the comparison point 45 and converts these analog signals into digital signals corresponding thereto independently.

The CPU 32 executes various operations and calculations in response to the signals given from the A-D converter 31 and in accordance with software stored therewithin as follows: The CPU 32 generates the first inverter frequency starting command signal $F_{S1}$ for operating the inverter at a predetermined starting frequency a prescribed time period (1–2 seconds) after the inverter DC source voltage is restored; the second inverter frequency decreasing command signal $F_{S2}$ for decreasing the starting inverter frequency when a first predetermined time period has elapsed (e.g. 0.5 sec) after $F_{S1}$ was generated; the third inverter frequency holding command signal $F_{S3}$ for holding the decreasing inverter frequency at a constant value when the inverter current drops below a predetermined value (e.g. 8 percent of rated current); the fourth inverter frequency increasing command signal $F_{S4}$ for increasing inverter frequency when a ratio of inverter voltage to inverter frequency reaches a predetermined value; the fifth inverter frequency controlling command signal $F_{S5}$ for steadily controlling inverter frequency when inverter frequency and voltage both reach their predetermined values, respectively, at a predetermined V/F ratio. Additionally, the CPU 32 generates a first inverter voltage starting command signal $V_{S1}$ for operating the inverter at a predetermined starting voltage when a second predetermined time period (e.g. 0.3 sec) after the first frequency command signal $F_{S1}$ was generated; a second inverter voltage decreasing command signal $V_{S2}$ for decreasing inverter voltage gently when a third predetermined time period (e.g. 0.2 sec) has elapsed after $V_{S1}$ was generated; a third inverter voltage increasing command signal $V_{S3}$ for increasing inverter voltage gently when the inverter current drops below the predetermined value (e.g. 8 percent of rated current); a fourth inverter voltage increasing command signal $V_{S4}$ for increasing inverter voltage gradually when the ratio of inverter voltage to inverter frequency reaches a predetermined value; and a fifth inverter voltage controlling command signal $V_{S5}$ for steadily controlling inverter voltage when frequency and voltage both reaches their predetermined values, respectively, at a predetermined V/F ratio.

Further, when the voltage detector 23 detects an abnormally high DC source voltage, the CPU 32 generates an overvoltage signal or an inverter disable signal $V_{dis}$ in order to open a switch $S_6$ provided in the gate signal generator section 50.

The D-A converter 33 converts the digital inverter voltage command signals $V_{S1}$, $V_{S2}$, $V_{S3}$, $V_{S4}$ and $V_{S5}$ obtained by the CPU 32 into analog signals corresponding thereto.

The input/output port 34 outputs various inverter frequency command signals, $F_{S1}$, $F_{S2}$, $F_{S3}$, $F_{S4}$ and $F_{S5}$ and the inverter disable signal $V_{dis}$ to the switches $S_1$ to $S_6$.

The gate signal generator section 50 includes a voltage-frequency (V-F) converter 51, a triangular-wave signal generator 52, a sine-wave signal generator 53, a comparator 54, a gate logic section 55 and a sixth switch $S_6$.

In general, an oscillator the oscillation frequency of which is varied according to a control voltage is called a voltage controlled oscillator (VCO). Among these VCOs, an oscillator the oscillation frequency of which is varied in proportion to the control voltage is called V-F converter, in particular.

Therefore, the V-F convertr 51 outputs a signal with a frequency proportional to the voltage signal outputted from the comparison point 45. The voltage signal is also applied to the CPU 32 through the A-D converter 31 to calculate a V/F ratio of the inverter.

The output signal from the V-F converter 51 is applied to the sine-wave signal generator 53. In response to the signal from the V-F converter 51, the sine-wave signal generator 53 outputs three-phase sine-wave signals U, V and W.

The triangular-wave signal generator 52 outputs a triangular-wave signal with a frequency which is an integral multiplier of the frequency of the sine-wave signal generator 53. The ratio of triangular-wave signal frequency to sine-wave signal frequency is 5 to 6 in steady state, however, 20 to 40 in starting the motor. In other words, the triangular/sine ratio is adjusted according inverter frequency and/or voltage; that is, the above ratio is controlled according to the voltage level at the comparison point 45 or in response to command signals outputted from the CPU 32 in accordance with software.

The sine wave signals and the triangular signal are both applied to the comparator 54 in order to obtain pulse width modulated (PWM) signals for each phase by comparing these sine-wave signals with the triangular-wave signals. The amplitude of the sine-wave signals is determined in response to the inverter voltage command signals $V_S$ applied from the CPU 32 through the D-A converter 33 to the sine-wave signal generator 53.

The comparator 54 generates three PWM (pulse width modulated) signals on the basis of the sine-wave signals and the triangular-wave signals. When the sine wave signal exceeds the triangular wave signal in voltage level, a pulse the width of which is modulated is generated. In more detail, the high-voltage (ON) time period of the PWM signal is from when the instantaneous voltage level of the sine-wave signal rises beyond that of the triangular-wave signal to when the instantaneous voltage level of the sine-wave signal drops below that of the triangular wave signal. Therefore, the higher the sine-wave signal voltage level, the longer the pulse width of the PWM signal.

The pulse width modulated signals are controlled by the gate logic circuit 55 in order to turn on each transistor U to Z in a predetermined sequence.

The operation of the system of the first embodiment according to the present invention will be described hereinbelow with reference to the timing chart shown in FIG. 2.

The reconnection of the inverter to the rotating motor is performed under the following conditions: (1) motor driving mode is selected in the microcomputer; (2) inverter reconnecting mode is selected in the microcomputer; and (3) the inverter is reconnected to one or more rotating motors after the inverter has been disconnected from the motors due to ground fault accident (described in detail under Description of the Prior Art) or after AC commercial source has failed for a short time period. FIG. 2 shows a case where the AC commercial power source is interrupted when the motor is being driven and then restored soon.

Figure 2:
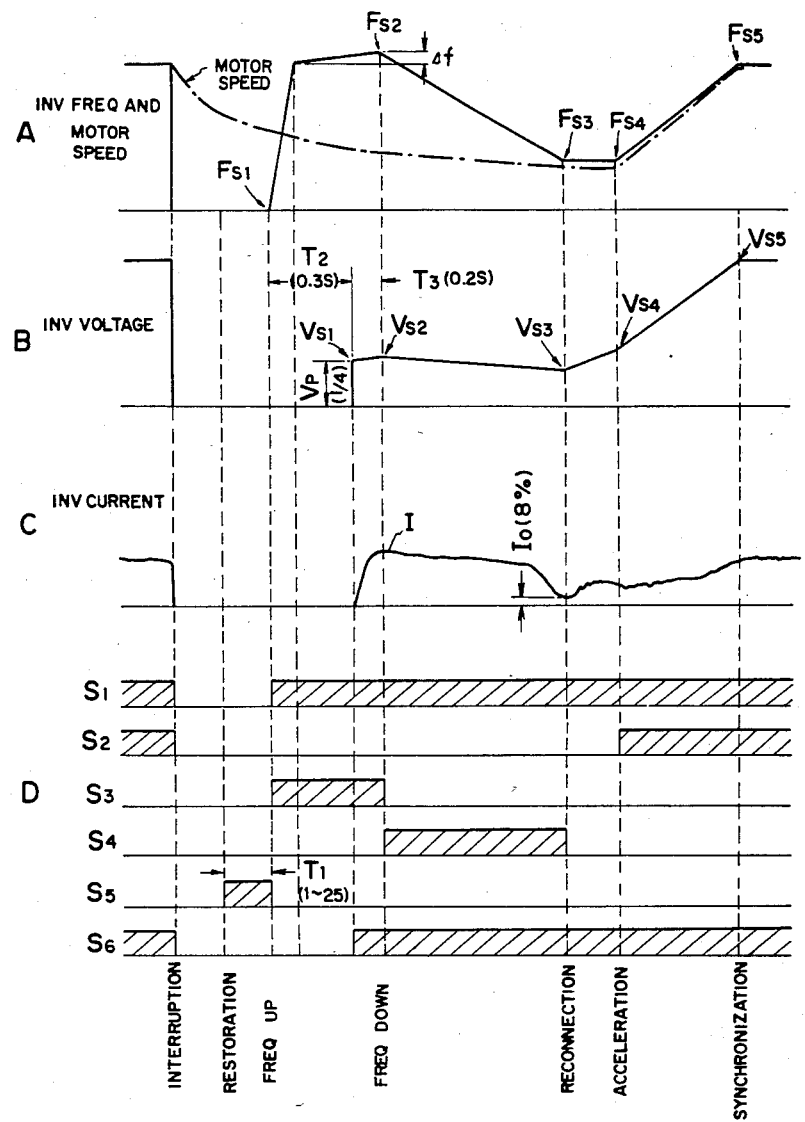
FIG. 2 is an operation timing chart of the system according to the present invention shown in FIG. 1, in which A represents inverter frequency by solid lines and motor frequency or speed by dotted and dashed lines; B represents inverter voltage; C represents inverter current; and D represents on-off timing of a plurality of switches incorporated with hardware of the system according to the present invention, respectively.

(1) When the commercial AC power source is interrupted, the motor speed begins to decrease gradually, as depicted by the dot-and-dashed line in FIG. 2-A, because the motor is kept rotated by the inertia force of the motor rotor. Even when the commercial AC power source is restored while the motor is rotating, the system does not immediately activate the inverter but waits for a short time (1 to 2 seconds). This short time interval is measured by a timer function of software stored in the microcomputer. The reason why the above short wait time is necessary is that: when the inverter is reconnected to the motor in asynchronization between the inverter and the induction motor in phase, since an interrupter arranged on the main power supply side may trip and further the inverter elements may be damaged at the worst, a great current flows to the inverter. During this short wait time interval the CPU 32 outputs an initialization command signal through the output port 34 to close the fifth switch $S_5$ connected across the integrator capacitor C, so that the electric charge within the capacitor C is discharged or the integrating circuit 43 is reset. This switch $S_5$ is opened after the short wait time has elapsed. Simultaneously, the CPU 32 outputs a first frequency command signal $F_{S1}$ to close the switches $S_1$ and $S_3$. Therefore, a positive frequency presetting voltage $V_0$ is applied to the frequency controller section 40 through the first switch $S_1$. After being inversed, the frequency presetting signal $V_0$ charges the integrator capacitor C with polarity as shown in FIG. 1. The time constant thereof is determined by the resistors $R_6$ and $R_7$ and the capacitance C. In this case, since the resistance $R_6$ is relatively small, the capacitor voltage rises rapidly to a voltage determined by the presetting device 41, as shown in FIG. 2-A, but rises slowly thereafter, as shown by $\Delta f$, in accordance with a time constant $(C.R_7)$ because the resistance $R_7$ connected to a negative supply voltage is relatively great. Here, it should be noted that the higher the integrator output voltage, the higher the frequency, because the V-F converter 51 outputs a pulse signal the frequency of which is proportional to the output voltage level of the integrating circuit 43.

When a predetermined time period (e.g. 0.3 secs.) has elapsed after the switch $S_3$ was closed, the CPU 32 outputs a first inverter voltage command signal $V_{S1}$ to the sine-wave signal generator 53 through the D-A converter 33 for determination of initial amplitude of the sine-wave signal. Simultaneously, the switch $S_6$ is closed to apply each gate signal to the power inverter 13.

The value of the inverter starting voltage $V_P$ is so determined empirically as to obtain effective inverter voltage in accordance with the following expressions:

$V_P =$ (voltage corresponding to frequency $-$ bias voltage)/4 + bias voltage

While the inverter frequency Δf rises gradually, the inverter voltage is also so determined as to rise gradually on the basis of the above-expression in accordance with software stored in the CPU 32.

(2) When a predetermined time interval (e.g. 0.2 sec.) has elapsed after $V_{S1}$ was generated, the CPU 32 outputs a second frequency command signal $F_{S2}$ to open the third switch $S_1$ and close the fourth switch $S_4$. Once the switch $S_4$ is closed, the capacitor C is charged reversely in accordance with a time constant (C.$R_8$), since a positive voltage is applied to the capacitor C through the resistor $R_8$. Therefore, the positive voltage in the output terminal of the integrator 43 drops gradually; as a result, the inverter frequency decreases as shown in FIG. 2-A. The down-slope of the inverter frequency or the time constant (C.$R_8$) is determined on the basis of the difference in frequency or speed between the inverter and the motor, that is, the motor load and the moment of motor rotor inertia.

Simultaneously, when a predetermined time has elapsed (0.2 sec), the CPU 32 outputs a second voltage command signal $V_{S2}$ to the sine-wave generator 53 to hold or decrease the inverter voltage gently as shown in FIG. 2-B.

(3) Since the inverter current is being detected by the current detector 21 and the detected current values are continuously applied to the CPU 32 through the A-D convertor 31, the CPU 32 detects a point of reconnection at which the inverter current drops below a predetermined value (e.g. 8 percent of the rated value).

When the above reconnection point is detected, the CPU 32 outputs the third frequency command signal $F_{S3}$ to open the fourth switch $S_4$ and simultaneously the third voltage command signal $V_{S4}$. Therefore, the voltage across the integrator capacitor C is held at a constant value; that is, the inverter frequency is kept at a constant value. Even while the frequency is kept constant, the inverter voltage is increased gradually to a value corresponding to the fixed inverter frequency, because the ratio of voltage to frequency is determined according to motor load. The rise in inverter voltage is controlled in accordance with software stored in the microcomputer 30.

(4) When the inverter voltage reaches a value corresponding to the held frequency at a predetermined V/F ratio, the CPU 32 outputs a fourth frequency command signal $F_{S4}$ to close the second switch $S_2$ and simultaneously a fourth voltage command signal $V_{S4}$. Therefore, the integrator capacitor C is charged up again in accordance with a time constant determined by the capacitor C and the resistor $R_5$ up to a voltage preset by the frequency presetting device 41 in the direction that the inverter frequency is increased gradually. Simultaneously, the inverter voltage is also gradually according to a fixed V/F ratio in accordance with software stored in the microcomputer 32.

(5) When the inverter frequency perfectly matches the motor speed and additionally, the V/F ratio is kept at a constant value, sine the inverter is determined to be perfectly synchronized with the motor, the CPU 32 outputs a fifth frequency command signal $F_{S5}$ and a fifth voltage command signal $V_{S5}$ in order to drive the motor under the normal driving condition in steady state.

In the above-mentioned inverter frequency and voltage controlling steps, in case an overvoltage is detected by the voltage detector 23, a rise in voltage or frequency is limited or held at a constant value.

Further, within the CPU 32, other various programs or subroutines are stored for executing various safety functions such as emergency stop, control undervoltage trip, inverter undervoltage trip, inverter overvoltage trip, inverter overcurrent trip, overload trip, overheat trip, etc., the description thereof being omitted herein because these functions are not directly related to the reconnection of the inverter to the rotating motor according to the present invention.

Figure 3:
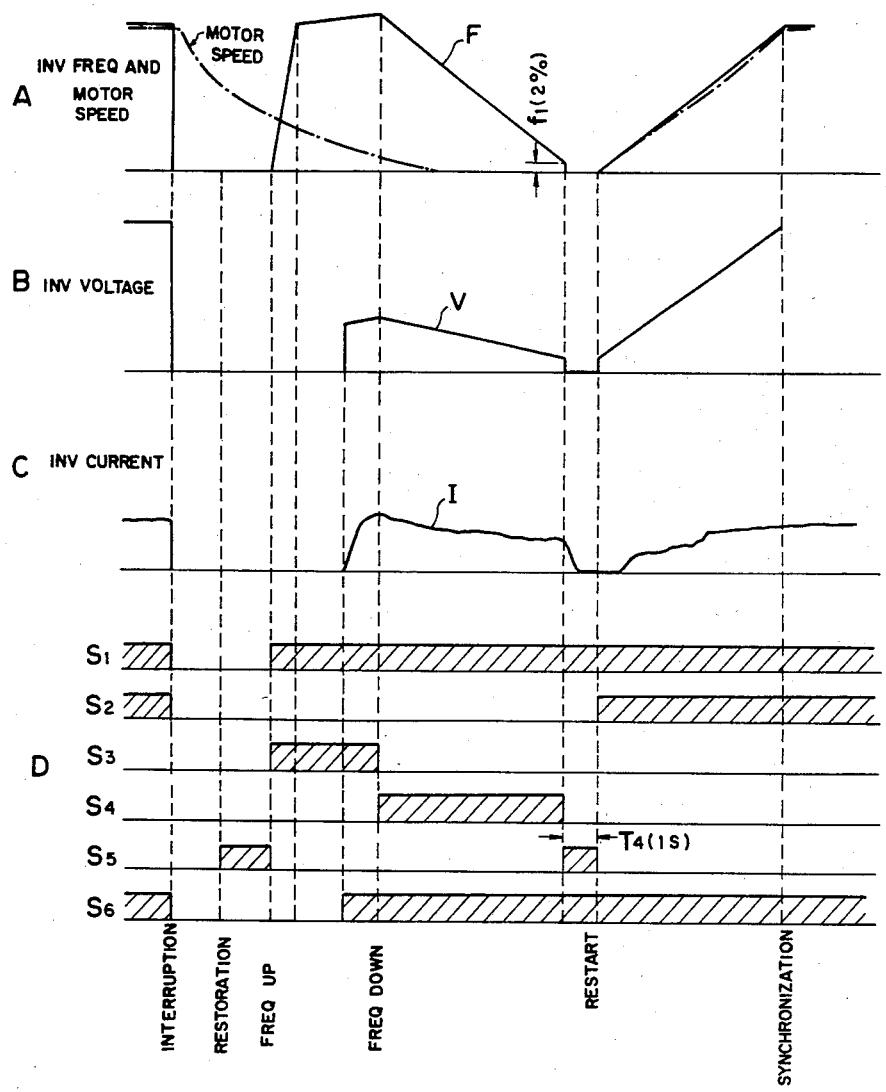
FIG. 3 is an operation timing chart of an modification of the first embodiment according to the present invention shown in FIG. 1, in which each symbol A, B, C and D represent motor speed, the magnitudes of inverter frequency, voltage and current and the on-off timing of switches, respectively, similar to FIG. 2.

FIG. 3 shows a timing chart in the case where the inverter frequency drops below 2 percent of the steady-state frequency without detecting the reconnection point at which the inverter current drops below the predetermined value (8 percent of the rated current). In such a case as described above, the switch $S_4$ is opened for stopping a decrease in inverter frequency and simultaneously the switch $S_5$ is once closed for resetting the inverter frequency to zero. Simultaneously, inverter voltage is once set to zero level. Thereafter, a predetermined time period has elapsed, the switch $S_5$ is opened and simultaneously the swith $S_2$ is closed. Therefore, the integrator capacitor C is charged up again in accordance with a time constant determined by capacitance C and the resistor $R_5$ in the direction that the inverter frequency is increased gradually. Simultaneously, the inverter voltage is also increased gradually with a fixed V/F ratio. The above operation is equivalent to restarting operation of the stopped motor. when the inverter frequency F perfectly matches the motor speed and additionally the v-F ratio is kept at a constant value, the inverter is determined to be perfectly synchronized with the motor. Thereafter, the motor is controllably driven under the normal driving conditions or in steady state.

Figure 4:
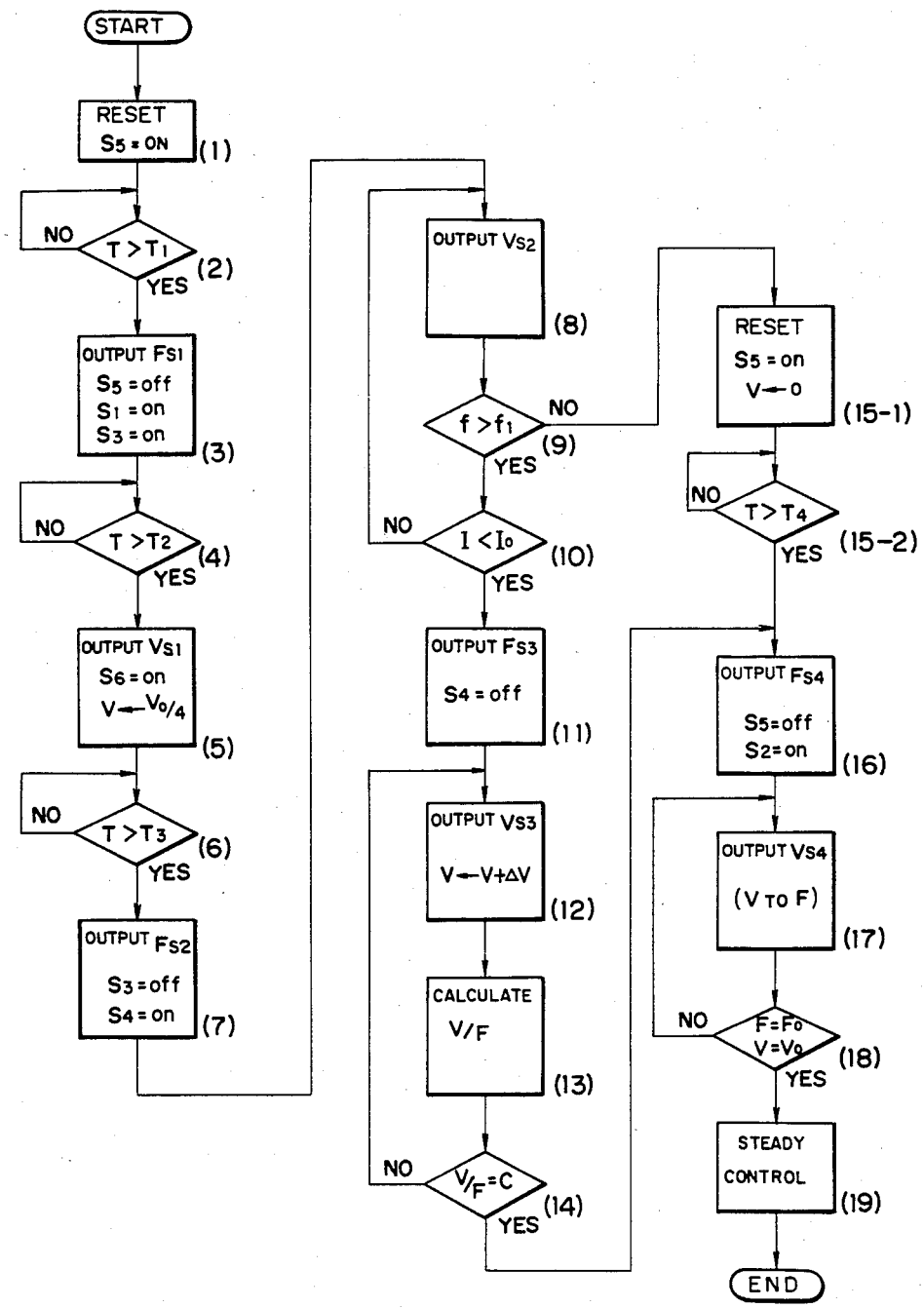
FIG. 4 is a flowchart showing the software used with the system according to the present invention shown in FIG. 1.

With reference to FIG. 4, program control executed by the CPU 32 will be described hereinbelow. When the commercial AC power source is restored, control first outputs at initialization command signal to reset the switch $S_5$ (in block 1), so that the electric charge in the integrator capacitor C is completely discharged into zero voltage level. Control operates counter function for measuring a first delay time $T_1$ (e.g. 1 to 2 seconds) to wait until a great surge voltage decreases (in block 2).

When the first delay time $T_1$ has elapsed, control outputs a first inverter frequency command signal $F_{S1}$ to open the reset switch $S_5$ and close the switches $S_1$ and $S_3$, so that the capacitor C is quickly charged to increase inverter frequency sharply (in block 3). In this step, after having been charged up to a voltage determined by a time constant of C.$R_6$, the capacitor C is further charged gradually by the negative power supply voltage through resistor $R_7$. Simultaneously, control operates counter function again for measuring a second delay time $T_2$ (e.g. 0.3 seconds) to wait until the capacitor C is charged up gradually (in block 4).

When the second delay time $T_2$ has elapsed, control outputs a first inverter voltage command signal $V_{S1}$ to apply a start voltage and an inverter enable command signal to close the gate switch $S_6$ (in block 5). The start voltage $V_P$ is approximately one-fourth times the rated inverter voltage. Simultaneously, control operates counter function again for measuring a third delay time $T_3$ (e.g. 0.2 seconds) (block 6).

When the third delay time $T_3$ has elapsed, control outputs a second inverter frequency command signal $F_{S2}$ to open the switch $S_3$ and to close the switch $S_4$, so that the capacitor C is discharged to decrease inverter frequency gradually (in block 7). In this step, the capacitor C is discharged gradually by the positive power supply voltage through the resistor $R_8$. Simultaneously, control outputs a second inverter voltage command signal $V_{S2}$ to decrease the inverter voltage gradually (block 8).

Thereafter, since both inverter frequency and voltage are decreased, frequency is first checked whether or not the frequency is higher than a predetermined value (e.g. 2 percent of the rated value) (in block 9). If the frequency is higher than the predetermined value, the second voltage command signal $V_{S2}$ is kept outputted, control advance to step (10). If the frequency is lower than the predetermined value, control advance to step (15).

In step (10), control checks whether or not the inverter current drops below a predetermined value (e.g. 8 percents of the rated current) (in block 10). If the current is higher than the predetermined value, the second voltage command signal $V_{S2}$ is kept outputted. But, if lower than the predetermined value, control outputs a third inverter frequency command signal $F_{S3}$ to open the switch $S_4$, so that the decreasing inverter frequency is held at the present value (in block 11), because also the switches $S_2$, $S_3$, and $S_4$ are opened. Simultaneously, control outputs a third inverter voltage command signal $V_{S3}$ to increase the voltage gradually (in block 12). Simultaneously, control calculates the ratio of inverter voltage to inverter frequency (in block 13). The calculated V/F ratio is checked whether it reaches a predetermined constant ratio (in block 14). If does not reach the predetermined ratio, control advances to step (13). In this state, since the voltage is increasing with the frequency kept constant, soon the calculated V/F ratio reaches the predetermined constant value. At a constant V/F ratio, control outputs a fourth inverter frequency command signal $F_{S4}$ to close the switch $S_2$ (in this state, the switch $S_5$ is already kept opened), so that the frequency is increased gradually (block 16). Simultaneously, control outputs a fourth inverter voltage command signal $V_{S4}$ in such a way that the predetermined V/F ratio is maintained. In other words, the voltage is so increased as to keep the predetermined V/F ratio in relation to the held frequency (in block 17). Thereafter, control checks whether or not the frequency and voltage both reach the predetermined values fo and Vo, respectively (in block 18). If both do not reach the values, both the command signals $F_{S4}$ and $V_{S4}$ are kept outputted to further increase the voltage and the frequency. However, if both reach the values, since the inverter voltage and frequency are both increased to the rated values, respectively, at the predetermined V/F ratio, control outputs a fifth inverter frequency and voltage command signals $F_{S5}$ and $V_{S5}$ to steadily control the inverter so that the motor can be driven in steady state (block 19).

Further, in step (9), if the frequency is lower than the predetermined value (e.g. 2 percent of the rated value), control outputs a frequency command signal to reset the switch $S_5$, so that the frequency is reset to zero. Simultaneously, control outputs a voltage command signal to set the voltage to zero (in block 15-1). Control operates counter function again for measuring a fourth delay time $T_4$ (e.g. 1 second) to wait until a surge voltage decreases perfectly (in block 15-2). When the fourth delay time $T_4$ has elapsed, control outputs the fourth inverter frequency $F_{S4}$ to open the switch $S_5$ and to close the switch $S_2$ (in block 16). Thereafter, the same control steps (17, 18, 19) as described already are implemented.

Figure 5:
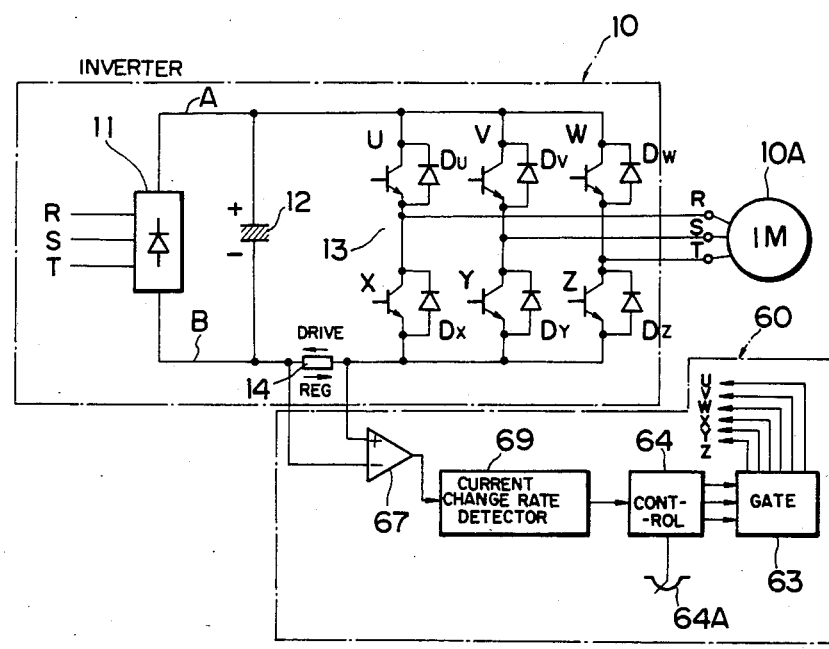
FIG. 5 is a schematic block diagram showing a motor driving system including an inverter and the system for reconnecting the inverter to a rotating motor of a second embodiment according to the present invention.

FIG. 5 shows a system configuration of a second embodiment of the present invention. The system is roughly made up of an inverter section 10 and an inverter reconnecting section 60. The inverter section 10 is made up of a diode bridge-connected power rectifier (AC-DC converter) 11, a rectifying capacitor 12, and a power inverter (DC-AC converter) 13 activated by the inverter reconnecting section 60. The inverter reconnecting section 60 for connecting the inverter 13 to an induction motor 10A is made up of a shunt resistance 14, an operational amplifier 67, and current change rate detector 69, a gate control unit 64, a motor speed presetting device 64A, and an inverter gate logic circuit unit 63.

The three-phase commercial AC power source R, S, and T, is first rectified by the diode power rectifier 11 and the rectifying capacitor 12 into a DC power source. The rectified DC power source is then converted by the power inverter 13 controlled by the aid of the gate logic circuit unit 63 and the gate control unit 64, into an AC power source having an appropriate frequency and an appropriate voltage both so determined as to drive the induction motor 10A at a predetermined speed and torque.

The power inverter 13 is made up of six bridge-connected switching semiconductor elements such as power transistors U, V, W, X, Y and Z and six regenerating diodes $D_U$, $D_V$, $D_W$, $D_X$, $D_Y$, and $D_Z$ connected each between the emitter and the collector of each power transistor. The switching power transistors are of course replaceable with other elements such as thyristors, gate-turn-off thyristors, etc.

In the power inverter 13, an inverter output having any desired pulse widths and pulse intervals can be obtained by appropriately applying input signals from the gate logic unit 63 to the base of each power transistor in sequence. In other words, it is possible to obtain any desired power source by controlling inverter frequency and inverter voltage. In more detail, the inverter output power increases with increasing inverter gate frequency; the effective inverter voltage increases with increasing inverter gate pulse width or with decreasing inverter gate pulse interval. Further, in general, PWM (Pulse Width Modulation) control method is adopted in order to simultaneously control both the frequency and the voltage of the inverter power source, in which a triangular wave signal is compared with a sine-wave signal in voltage level to determine each timing of the gate signals. The above-mentioned PWM method is implemented by the gate control unit 64.

The motor speed presetting device 64A such as a variable resistor serves to preset a desired inverter frequency in the form of a DC voltage level. In response to the DC voltage preset by the motor speed presetting device 64A, a voltage controlled oscillator (VCO) (not shown) incorporated in the gate control unit 64 outputs a sine-wave signal the frequency of which is proportional to the preset DC voltage. A triangular wave signal generator (not shown) also incorporated in the gate control unit 4 outputs a triangular-wave signal the frequency of which is an integer multiple of the frequency of the sine-wave signal outputted from the voltage-controlled oscillator. In summary, it is possible to control the frequency and the effective voltage of the power inverter 13 by the aid of the gate control unit 64. In response to the output signals from the gate control unit 64, the gate logic circuit unit 63 outputs a sequence of gate signals to the semiconductor elements of the power inverter 13.

In the reconnecting section, the shunt resistance 14 is connected in series with the power inverter 13 on the DC power source side, and the operational amplifier 67 is connected across the shunt resistance 14 as shown in FIG. 5. The shunt resistance 14 serves to detect a small current proportional to a large current flowing between the DC power source and the power inverter 13. The operational amplifier 67 serves to detect the direction of the current flowing through the shunt resistance 14 in addition to the magnitude of the current flowing therethrough. The reason why it is necessary to detect the direction of the current flowing through the shunt resistance 14 is that in the system according to the present invention, the inverter frequency and the inverter voltage are both controlled in dependence upon the direction of the current flowing between the DC power source 11 and the power inverter 13, as described hereinbelow in more detail.

When the induction motor 10A is driven by the power inverter 13 (motor driving mode), the driving current flows from the terminal A of the diode rectifier 11 to the terminal B thereof by way of transistor U, the terminal R of the motor 10A, the terminal T thereof, the transistor Z and the shunt resistance 14. Accordingly, the motor driving current flows through the shunt resistance 14 in the leftward direction as shown in FIG. 5.

In contrast with this, when the motor regenerates a power (motor regeneration mode), the regenerated current flows from the terminal R of the motor to the terminal T thereof by way of the regenerating diode D$_U$, the positive terminal (+) of the capacitor C, the negative terminal (−) thereof, the shunt resistance 14, and the regenerating diode D$_Z$. Here, the regeneration means that when the inverter frequency is lower than motor speed, the induction motor 10A functions as a generator connected to the power inverter. In this state, a motor kinetic energy is transduced into an electric power by the motor windings and is returned or restored to the DC power side from the rotating motor. Accordingly, the regenerated current flows through the shunt resistance 14 in the rightward direction as shown in FIG. 5.

Figure 6:
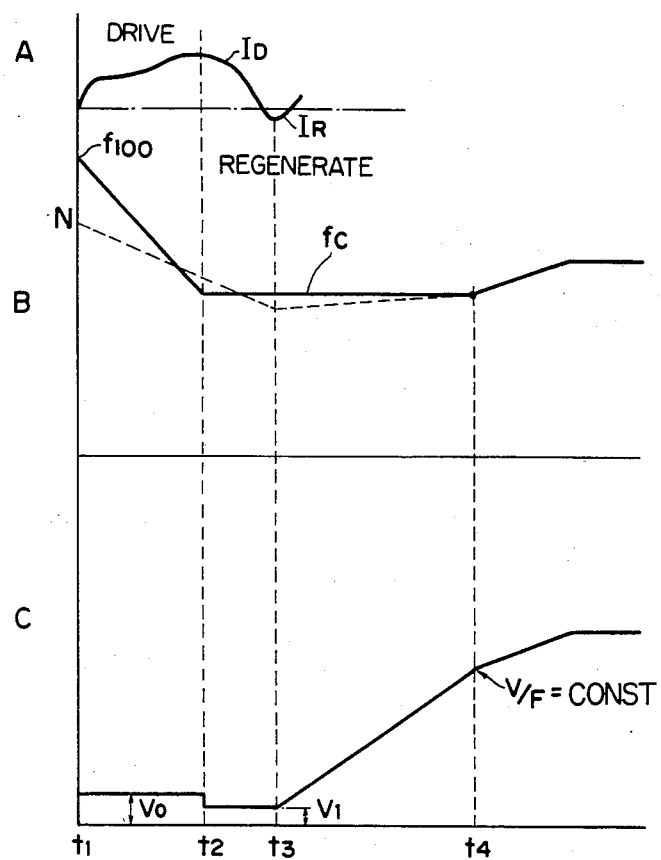
FIG. 6 is an operation timing chart of the system according to the present invention shown in FIG. 5, in which A represents inverter current; B represents inverter frequency by solid lines and motor frequency or speed by dashed lines; and C represents inverter voltage, respectively.

Therefore, where the motor 10A is in driving mode, the shunt resistance 14 outputs a positive voltage, for instance, the level of which is roughly proportional to the driving current; when the motor 10A is in regeneration mode, the shunt resistance 14 outputs a negative voltage the level of which is roughly proportional to the regenerating current, both as depicted in FIG. 6-A.

Further, although the driving current or the regenerated current is a sine-wave signal or a pulse signal, these signals are smoothed by the rectifying capacitor 12 into a roughly dc voltage level.

In this connection, it is also possible to use an ordinary amplifier in place of the operational amplifier. In this case, a kind of current transformer is connected in place of the shunt resistance 14. The primary winding of the current transformer is arranged near the conductor connected between the DC power source 11 and the power inverter 13, and an additional DC power source is connected to the secondary winding thereof in order to distinguish the direction of the current flowing through the primary winding of the current transformer.

Further, it is also possible to use other elements such as a Hall Effect element. This is because the Hall Effect element also can detected the magnitude and the direction of current flowing therethrough, simultaneously.

The operational amplifier 67 amplifiers a voltage signal developed across the shunt resistance 14 and detects the polarity of the voltage signal. In response to the output signal from the operational amplifier 67, it is possible to detect motor driving mode or motor regeneration mode on the basis of the polarity of the output signal and further to detect the change rate in each mode on the basis of the change in voltage level of the output signal, as depicted in FIG. 6-A.

The current change rate detector 69 differentiates the output signal of the operational amplifier 67 and outputs a first command signal when the output voltage level of the amplifier 67 is positive (driving mode) and the change rate of the output voltage level thereof is zero (dI/dt=0), that is, the gradient of the output voltage level changes from positive to negative. Further, the detector 9 outputs a second command signal when the output voltage level is negative (regeneration mode) and the change rate of the output voltage level thereof is zero (dI/dt=0), that is, the gradient of the output voltage level changes from negative to positive.

The gate control unit 64 controls the gate signals applied to the switching elements U to Z of the power inverter 13 through the gate logic unit 63, in response to the output signal from the current change rate detector 69, in order to control the frequency and voltage of the power inverter 13 so that the power inverter can be connected to the rotating induction motor 10A stably under synchronized conditions.

The operation of the system for connecting an inverter power to a rotating induction motor according to the present invention will be described herein below with reference to the operation timing chart shown in FIG. 6.

When the rotating induction motor 10A is once disconnected from the power inverter 13 because of commercial power failure, for instance, and then connected again to the motor 10A while the motor 10A is still rotating, it is indispensable to synchronously reconnect the inverter 13 to the induction motor 10A. In other words, it is necessary to apply an inverter output to the rotating motor 10A after inverter frequency or phase has matched motor frequency or phase. Othersise, a rush current will be generated by the motor and thereby the inverter elements may be damaged.

To safely reconnect the inverter to the motor, the power inverted 13 is started by the gate control unit 64 in accordance with the following procedure: the gate control unit 64 outputs a sequence of gate signals for driving the inverter 13 at a frequency f$_{100}$ higher than the initial rotational speed N of the motor rotating due to an inertia force of the motor rotor or equal to the maximum rotational speed of the motor 10A and at a voltage V$_0$ lower than a normal voltage, which may pass a motor rated current, at time t$_1$ shown in FIG. 6.

This frequency f$_{100}$ can simply be determined so as to exceed the rotational speed N at the time when the motor is rotating in steady state. However, it is necessary to determine the voltage V$_0$ under consideration of various factors such as motor speed, motor rotor inertia, motor load, etc. In general, the voltage V$_0$ is determined so as to pass a current which is one-tenth (1/10) to one-fifth (1/5) times the motor rated current.

Then, the gate control unit 64 gradually decreases the inverter frequency f. Therefore, the motor driving current $I_D$ supplied from the inverter 13 to the motor 10A increases as the inverter frequency f approaches the motor speed N because the inverter voltage is held at a constant value $V_0$. The instant the inverter frequency f reaches the motor speed N, there still exists an increasing motor driving current due to transient phenomena. However, after a short time has elapsed, the increasing motor driving current $I_D$ reaches at its maximum point at which the differential coefficient is zero, at time $t_2$ as shown in FIG. 6-A. At time $t_2$, since the inverter current is positive indicating the driving mode, the current change rate detector 9 outputs the first command signal to the control unit 64. In response this first command signal, the control unit 64 holds the inverter frequency at a constant value $f_c$ and the inverter voltage at another constant value $V_1$ lower than $V_0$. This voltage $V_1$ is approximately ⅛ times lower than a voltage by which the inverter is reconnected at time $t_4$.

After the frequency $f_c$ is kept at a constant value, since the inverter is not synchronized with the motor, the motor driving current $I_D$ decreases. When the inverter current decreases below a zero level, the motor driving mode is switched to motor regeneration mode; that is, a motor kinetic energy is transduced into an electric power and returned to the power inverter 13 because the motor speed N is higher than the held frequency $f_c$. In this regeneration mode, the regenerated current continues increasing. However, at this state, since the motor speed further drops below the held inverter frequency $f_c$, after a short time period, the regenerated current $I_R$ begins to decrease soon at time $t_3$. Since the inverter current is negative indicating the regeneration mode, the current change rate detector 49 outputs the second command signal to the control unit 64. In response to this second command signal, the control unit 64 begins to increase the inverter voltage gradually. Therefore, the motor speed begins to increase. When the ratio V/F of inverter voltage to inverter frequency reaches a constant value at time $t_4$ in FIG. 6, the reconnecting operation is completed because the inverter frequency is completely synchronized with the motor speed. Thereafter, the gate control unit 64 controls the inverter 13 so that the induction motor 10A rotates at a speed preset by the motor speed presetting device 64A. Under these conditions, the normal motor driving current $I_D$ can be detected by the operational amplifier 67.

In summary, the method of reconnecting the inverter power to a rotating motor comprises the following steps of:

(a) starting the inverter at a frequency $f_{100}$ higher than the speed N of the rotating motor and at a first voltage $V_0$ lower than the rated value of the motor;

(b) decreasing the inverter frequency gradually with the inverter output voltage $V_0$ constant;

(c) detecting the motor driving current $I_D$;

(d) when the detected motor driving current $I_D$ reaches its maximum value, holding the inverter frequency at a constant value $f_c$ and the inverter voltage at a second voltage $V_1$ lower than $V_0$;

(e) detecting the motor regenerated current $I_R$;

(f) when the detected motor regenerated current $I_R$ reaches its maximum value, increasing the inverter voltage gradually from the second voltage $V_1$ until the ratio of inverter voltage to inverter frequency reaches a predetermined value.

In this second embodiment, when the inverter voltage is increased from time $t_3$, since the inverter frequency is kept at a constant value $f_c$, there exists an advantage that it is possible to effectively prevent an overvoltage from being generated in the motor regeneration mode.

Further, in the case where motor load is very light, there exists the case where the motor is directly synchronized with the power inverter without having the motor regeneration mode. In such a case as described above, when the motor driving current reaches its minimum value the inverter voltage is controlled so as to be increased gradually until the ratio (V/F) becomes a predetermined value while keeping the frequency at a constant value, at which the reconnecting operation is completed because the inverter frequency is completely synchronized with the motor frequency.

As described above, in the method and system of reconnecting an inverter to a motor or motors rotating due to the inertia force of the motor rotor according to the present invention, since the inverter power is reconnected to the rotating motor in accordance with open-loop control method, that is, in dependence upon motor driving current and motor regenerated current both detectable on the inverter side without use of any motor speed detecting means, it is possible to reconnect the inverter power to the rotating motor at a higher response speed and further to simplify the system configuration.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A method of reconnecting to an inertially rotating motor an inverter disconnected from the motor during powered operation of the motor and inverter, comprising the steps of:

(a) detecting a power failure or a motor accident condition causing the inverter to be disconnected from the powered motor and resulting in inertial rotation of the motor at a reduced speed due to loss of power from the powering inverter therefrom;

(b) detecting inverter current;

(c) restarting the inverter at an increased frequency and reduced voltage level to provide to the rotating motor a restarting voltage having a frequency higher than a frequency corresponding to the speed of inertial rotation of the motor and a restarting voltage level lower than a rated voltage of the motor;

(d) generating a first command signal $F_{S1}$ for restarting said inverter frequency, generating a second command signal $F_{S2}$ for decreasing inverter frequency after passage of a predetermined time period from generation of said first command signal $F_{S1}$, generating a third command signal $F_{S3}$ for maintaining inverter frequency when detected inverter current drops below a predetermined current value, generating a fourth command signal $F_{S4}$ for increasing inverter frequency when a ratio of inverter voltage level to inverter frequency reaches a predetermined value, generating a fifth command signal $F_{S5}$ for controlling inverter frequency when inverter frequency and voltage level both attain predetermined values therefor at the predetermined ratio thereof;

(e) generating a first voltage command signal $V_{S1}$ for generation of an inverter voltage level by said inverter after passage of a second predetermined time period from generation of said first command signal $F_{S1}$, generating a second voltage command signal $V_{S2}$ for controlling said inverter voltage level after passage of a third predetermined time period from generation of said first voltage command signal $V_{S1}$, generating a third voltage command signal $V_{S3}$ for increasing inverter voltage level when the detected inverter current drops below said predetermined current value, generating a fourth voltage command signal $V_{S4}$ for increasing said inverter voltage level when the ratio of inverter voltage level to inverter frequency reaches said predetermined value thereof, and generating a fifth inverter voltage command $V_{S5}$ for controlling inverter voltage level when inverter frequency and voltage level both attain said predetermined values therefor at the predetermined ratio thereof;

(f) outputting a first voltage representative of a first inverter frequency starting signal for restarting the inverter at a predetermined starting frequency in response to the first frequency command signal $F_{S1}$, outputting a second voltage representative of a second inverter frequency decreasing signal for gradually decreasing the frequency of the restarted inverter in response to the second frequency command signal $F_{S2}$, outputting a third voltage representative of a third inverter frequency maintaining signal for maintaining the decreasing inverter frequency at a constant value in response to the third frequency command signal $F_{S3}$, outputting a fourth voltage representative of a fourth inverter frequency increasing signal for increasing the maintained frequency in response to the fourth frequency command signal $F_{S4}$, and outputting a fifth voltage representative of a fifth inverter frequency controlling signal for steadily controlling inverter frequency in response to the fifth frequency command signal $F_{S5}$; and (g) sequentially generating pulse-width-modulated inverter gate signals to activate the inverter in response to the first, second, third, fourth and fifth voltages representative of inverter frequencies and to the first, second, third, fourth and fifth inverter voltage command signals.

2. Apparatus for reconnecting to an inertially rotating motor an inverter disconnected from the motor during powered operation of the motor and inverter, comprising:

(a) means for detecting a power failure or a motor accident condition causing the inverter to be disconnected from the powered motor and resulting in inertial rotation of the motor at a reduced speed due to loss of power from the powering inverter;

(b) current detecting means for detecting inverter current;

(c) microcomputer means for restarting the inverter at an increased frequency and reduced voltage level to provide to the rotating motor a restarting voltage having a frequency higher than a frequency corresponding to the speed of inertial rotation of the motor and a restarting voltage level lower than a rated voltage of the motor;

(d) said microcomputer means responsive to said inverter current detecting means and operable for generating a first command signal $F_{S1}$ for restarting said inverter frequency, generating a second command signal $F_{S2}$ for decreasing inverter frequency after passage of a predetermined time period from generation of said first command signal $F_{S1}$, generating a third command signal $F_{S3}$ for maintaining inverter frequency when detected inverter current drops below a predetermined current value, generating a fourth command signal $F_{S4}$ for increasing inverter frequency when a ratio of inverter voltage level to inverter frequency reaches a predetermined value, generating a fifth command signal $F_{S5}$ for controlling inverter frequency when inverter frequency and voltage level both attain predetermined values therefor at the predetermined ratio thereof, and said microcomputer means further operable for generating a first voltage command signal $V_{S1}$ for generation of an inverter voltage level by said inverter after passage of a second predetermined time period from generation of said first command signal $F_{S1}$, generating a second voltage command signal $V_{S2}$ for controlling said inverter voltage level after passage of a third predetermined time period from generation of said first voltage command signal $V_{S1}$, generating a third voltage command signal $V_{S3}$ for increasing inverter voltage level when the detected inverter current drops below said predetermined current value, generating a fourth voltage command signal $V_{S4}$ for increasing said inverter voltage level when the ratio of inverter voltage level to inverter frequency reaches said predetermined value thereof, and generating a fifth inverter voltage command $V_{S5}$ for controlling inverter voltage level when inverter frequency and voltage level both attain said predetermined values therefor at the predetermined ratio thereof;

(e) frequency controlling means responsive to said microcomputer means for controlling inverter frequencies, said controlling means operable for outputting a first voltage representative of a first inverter frequency starting signal for restarting the inverter at a predetermined starting frequency in response to the first frequency command signal $F_{S1}$, outputting a second voltage representative of a second inverter frequency decreasing signal for gradually decreasing the frequency of the restarted inverter in response to the second frequency command signal $F_{S2}$, outputting a third voltage representative of a third inverter frequency maintaining signal for maintaining the decreasing inverter frequency at a constant value in response to the third frequency command signal $F_{S3}$, outputting a fourth voltage representative of a fourth inverter frequency increasing signal for increasing the maintained frequency in response to the fourth frequency command signal $F_{S4}$, and outputting a fifth voltage representative of a fifth inverter frequency controlling signal for steadily controlling inverter frequency in response to the fifth frequency command signal $F_{S5}$; and (f) pulse-width-modulating means responsive to said microcomputer means and to said frequency controlling means for sequentially generating pulse-width-modulated inverter gate signals to activate the inverter in response to the first, second, third, fourth and fifth voltages representative of inverter frequencies and to the first, second, third, fourth and fifth inverter voltage command signals.

3. An apparatus for reconnecting an inverter to a motor as set forth in claim 2, wherein said frequency controlling means comprises:
   (a) an integrating circuit including a capacitor for charging DC voltages representative of inverter frequencies;
   (b) an initial inverter frequency presetting device for outputting a voltage to charge the capacitor;
   (c) a first capacitor charging resistor having a relatively short time constant with respect to the capacitor and connected between said initial inverter frequency presetting device and the capacitor for quickly charging the capacitor in response to the first command signal $F_{S1}$;
   (d) a second capacitor charging resistor having a relatively long time constant with respect to the capacitor and connected in parallel with said first capacitor charging resistor and between a negative power supply and the capacitor for further gently charging the capacitor in response to the first command signal $F_{S1}$ after the capacitor has been charged up quickly by the voltage outputted from said initial inverter frequency presetting device;
   (e) a third capacitor discharging resistor having a medium time constant with respect to the capacitor and connected between a positive power supply and the capacitor for discharging the capacitor in response to the second command signal $F_{S2}$; said third resistor being disconnected from the capacitor for holding electric charge of the capacitor at a constant value in response to the third command signal $F_{S3}$; and
   (f) a fourth capacitor charging resistor having a medium time constant with respect to the capacitor and connected between said initial inverter frequency presetting device and the capacitor for charging the capacitor in response to the fourth command signal $F_{S4}$.

4. An apparatus for reconnecting an inverter to a motor as set forth in claim 2, wherein said pulse-width-modulating means comprises:
   (a) a voltage-frequency converter responsive to said frequency controlling means for outputting signals having frequencies proportional to voltages developed across a capacitor;
   (b) a triangular-wave signal generator responsive to said frequency controlling means for generating triangular-wave signals having frequencies an integer times higher than that of the signals from said voltage-frequency converter;
   (c) a sine-wave signal generator responsive to said microcomputer means and said voltage-frequency converter for generating sine-wave signals having frequencies equal to the signals from said voltage-frequency converter and amplitudes adjusted according to the inverter voltage command signals;
   (d) a comparator responsive to said triangular-wave signal generator and said sine-wave signal generator for comparing the voltages thereof to determine effective inverter voltages in accordance with a pulse width modulation method; and
   (e) a gate logic circuit responsive to said comparator for outputting gate signals in sequence to the inverter in such a way that inverter frequencies and inverter voltages are both controlled in accordance with the pulse width modulation method.

5. An apparatus for reconnecting an inverter to a motor as set forth in claim 2, which further comprises:
   (a) a voltage detector for detecting a DC supply voltage of the inverter and outputting an overvoltage signal; to said microcomputer means when the DC supply voltage is excessively high; and
   (b) a plurality of switching elements connected between said pulse-width modulating means and the inverter, said switching elements being opened in response to an inverter disable signal indicative of DC supply overvoltage outputted from said microcomputer means.

6. An apparatus for reconnecting an inverter to a motor as set forth in claim 2, which further comprises:
   (a) an overcurrent protector responsive to said current detecting means for outputting an inverter overcurrent signal when inverter current is excessively large; and
   (b) a comparison point provided in said frequency controlling means for subtracting a voltage level of the inverter overcurrent signal from the voltages representative of inverter frequencies in order to adjustably control the voltages representative of inverter frequencies.

* * * * *